US009623753B2

(12) United States Patent
Mori et al.

(10) Patent No.: US 9,623,753 B2
(45) Date of Patent: Apr. 18, 2017

(54) COOLING CONTROL APPARATUS AND COOLING CONTROL METHOD FOR AN ELECTRIC VEHICLE MOTOR

(71) Applicant: Mitsubishi Electric Corporation, Tokyo (JP)

(72) Inventors: Nobuhide Mori, Tokyo (JP); Keiichi Enoki, Tokyo (JP); Hiroyuki Kobayashi, Kobe (JP); Yasufumi Ogawa, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/766,503

(22) PCT Filed: Apr. 11, 2013

(86) PCT No.: PCT/JP2013/060950
§ 371 (c)(1),
(2) Date: Aug. 7, 2015

(87) PCT Pub. No.: WO2014/167690
PCT Pub. Date: Oct. 16, 2014

(65) Prior Publication Data
US 2015/0367734 A1 Dec. 24, 2015

(51) Int. Cl.
B60L 3/00 (2006.01)
B60L 3/12 (2006.01)
(Continued)

(52) U.S. Cl.
CPC ............... *B60L 3/0061* (2013.01); *B60L 3/12* (2013.01); *B60L 11/1816* (2013.01);
(Continued)

(58) Field of Classification Search
CPC .......... B60L 3/0061; B60L 3/12; B60L 15/20; B60L 11/1816; B60L 15/2054; H02K 9/19; H02K 29/0044
(Continued)

(56) References Cited

U.S. PATENT DOCUMENTS 9,067,500 B2 * 6/2015 Penev ....................... B60L 7/28
2002/0113615 A1 8/2002 Atarashi
(Continued)

FOREIGN PATENT DOCUMENTS

JP 10-238345 A 9/1998
JP 11-18496 A 1/1999
(Continued)

OTHER PUBLICATIONS

International Search Report of PCT/JP2013/060950 dated Jul. 16, 2013.
(Continued)

*Primary Examiner* — Yazan Soofi
(74) *Attorney, Agent, or Firm* — Sughrue Mion, PLLC; Richard C. Turner

(57) ABSTRACT

A vehicle control part includes: a vehicle stop determination part for determining whether or not the vehicle is stopped; a clutch control part for disengaging the clutch when stop of the vehicle is determined; a motor control part for driving the motor so as to drive the oil circulation part after the clutch is disengaged; and a motor magnet temperature estimation part for detecting an inducted voltage generated by drive of the motor, and estimating a magnet temperature of the motor from the detected induced voltage of the motor. The motor control part continues the drive of the motor when the estimated magnet temperature of the motor is higher than a predetermined reference temperature at which the motor needs to be cooled, and stops the drive of the (Continued)

motor when the magnet temperature of the motor is equal to or lower than the predetermined reference temperature.

8 Claims, 6 Drawing Sheets

(51) Int. Cl.
*B60L 5/20* (2006.01)
*B60L 11/18* (2006.01)
*B60L 15/20* (2006.01)
*H02K 9/19* (2006.01)
*H02P 29/60* (2016.01)

(52) U.S. Cl.
CPC .......... *B60L 15/20* (2013.01); *B60L 15/2054* (2013.01); *H02K 9/19* (2013.01); *H02P 29/60* (2016.02); *B60L 2240/36* (2013.01); *B60L 2240/425* (2013.01); *B60L 2260/44* (2013.01); *Y02T 10/645* (2013.01); *Y02T 10/7005* (2013.01); *Y02T 10/7072* (2013.01); *Y02T 10/72* (2013.01); *Y02T 10/7275* (2013.01); *Y02T 90/14* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2010/0109586 | A1* | 5/2010 | Matsui | B60L 11/14 318/400.04 |
| 2010/0204862 | A1* | 8/2010 | Uejima | B60K 6/445 701/22 |
| 2012/0271498 | A1* | 10/2012 | Kobayashi | B60W 10/06 701/22 |

FOREIGN PATENT DOCUMENTS

| | | |
|---|---|---|
| JP | 2001-157304 A | 6/2001 |
| JP | 2002-199776 A | 7/2002 |
| JP | 2005-127406 A | 5/2005 |
| JP | 2005-218271 A | 8/2005 |
| JP | 2008-206339 A | 9/2008 |
| JP | 2011-083048 A | 4/2011 |
| WO | 2012/026044 A1 | 3/2012 |

OTHER PUBLICATIONS

Communication dated Aug. 29, 2016 from the State Intellectual Property Office of the P.R.C. in counterpart application No. 201380075494.3.

* cited by examiner

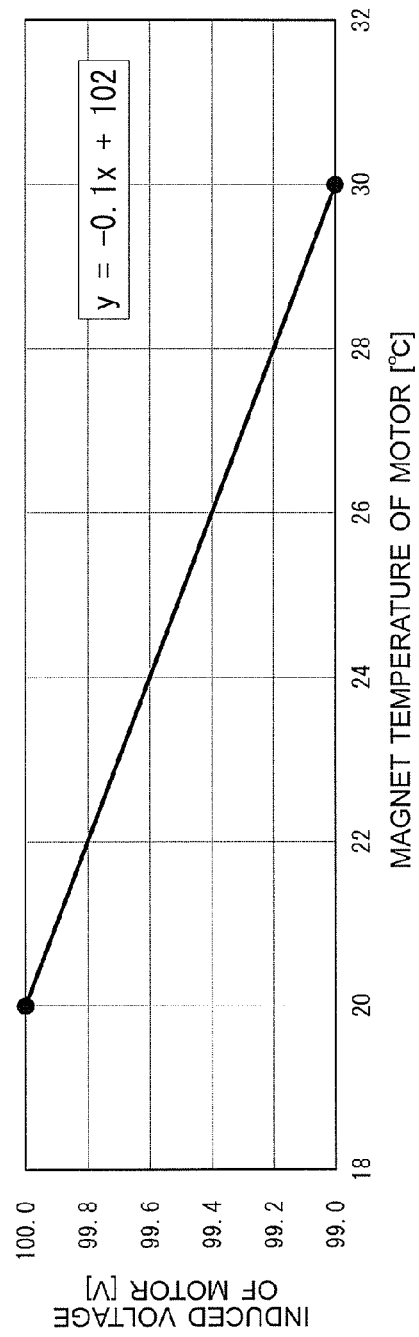

COOLING CONTROL APPARATUS AND COOLING CONTROL METHOD FOR AN ELECTRIC VEHICLE MOTOR

CROSS REFERENCE TO RELATED APPLICATIONS

This application is a National Stage of International Application No. PCT/JP2013/060950 filed Apr. 11, 2013, the contents of all of which are incorporated herein by reference in their entirety.

TECHNICAL FIELD

The present invention relates to a cooling control apparatus and a cooling control method for an electric vehicle motor, for cooling a motor configured to transmit power to wheels of a vehicle.

BACKGROUND ART

In recent years, due to a rise in the environment consciousness and an increasing concern in depletion of petroleum resources in the future, a reduction in the fuel consumption of the vehicle is further required. Moreover, a rapid progress is observed in secondary cells (batteries) represented by a lithium-ion battery, and use of electric power as power for travel is actively attempted, such as that in an electric vehicle and a hybrid vehicle.

As the performance of the electric vehicle and the hybrid vehicle increases, the output density of a motor increases, and the calorific value increases. Thus, in order to cope with the increase in the calorific value, in addition to a reduction in the calorific value by means of an increase in efficiency of the motor and an increase in heat resistance of coils, magnets, and the like, various motor cooling methods are proposed.

For example, as one of the motor cooling methods, there is proposed such a method that, in a motor control apparatus including a clutch for transmitting or disconnecting power from a motor to wheels and an oil pump driven by the motor to supply oil to the motor, when a magnet temperature of the motor is relatively higher than a predetermined reference temperature at which the motor needs to be cooled, and when a vehicle is determined to be stopped, the clutch is disengaged, and then the motor is driven to drive the oil pump, to thereby supply the oil to the motor to cool the motor (for example, refer to Patent Literature 1).

CITATION LIST

Patent Literature

[PTL 1] JP 2011-83048 A

SUMMARY OF INVENTION

Technical Problems

However, the related art has the following problems.

In the invention according to Patent Literature 1, in a control routine, only when the above-mentioned predetermined condition is satisfied, the motor is cooled. The motor may thus be driven or not driven immediately after the vehicle is determined to be stopped, and hence the behavior of the vehicle immediately after the vehicle is determined to be stopped is not always the same. Therefore, there is such a problem in that a user feels a sense of discomfort.

Moreover, the magnet temperature of the motor is detected by a temperature sensor. Therefore, when the actual magnet temperature of the motor is higher than the reference temperature, but the temperature sensor detects that the actual magnet temperature of the motor is lower than the reference temperature for some reason, a control routine for cooling the motor is not invoked. Therefore, there is such a problem in that, for example, in a dead soak state immediately after a high load operation such as a low-speed hill-climbing travel, a demagnetization phenomenon or the like occurs by an increase in the magnet temperature of the motor, resulting in a damage on the motor.

The present invention has been made in view of the above-mentioned problems, and therefore has an object to provide a cooling control apparatus and a cooling control method for an electric vehicle motor, which are capable of reducing the damage on the motor without the sense of discomfort felt by the user.

Solution to Problems

According to one embodiment of the present invention, there is provided a cooling control apparatus for an electric vehicle motor, including: a motor for transmitting power to a wheel of a vehicle; a clutch for transmitting or disconnecting the power from the motor to the wheel; an oil circulation part to be driven in operational association with the motor, for circulating oil to the motor; and a vehicle control part for controlling operations of the motor and the clutch, in which: the vehicle control part includes: a vehicle stop determination part for determining whether or not the vehicle is stopped; a clutch control part for disengaging the clutch when stop of the vehicle is determined; a motor control part for driving the motor so as to drive the oil circulation part after the clutch is disengaged; and a motor magnet temperature estimation part for detecting an inducted voltage generated by drive of the motor, and estimating a magnet temperature of the motor from the detected induced voltage of the motor; and the motor control part continues the drive of the motor when the estimated magnet temperature of the motor is higher than a predetermined reference temperature at which the motor needs to be cooled, and stops the drive of the motor when the magnet temperature of the motor is equal to or lower than the predetermined reference temperature.

Further, according to one embodiment of the present invention, there is provided a cooling control method for an electric vehicle motor, which is to be executed in an electric vehicle including: a motor for transmitting power to a wheel of the electric vehicle; a clutch for transmitting or disconnecting the power from the motor to the wheel; and an oil circulation part to be driven in operational association with the motor, for circulating oil to the motor; the cooling control method for an electric vehicle motor including: a vehicle stop determining step of determining whether or not the vehicle is stopped; a clutch disengaging step of disengaging the clutch when stop of the vehicle is determined; a motor driving step of driving the motor so as to drive the oil circulation part after the clutch is disengaged; a motor magnet temperature estimating step of detecting an inducted voltage generated by drive of the motor, and estimating a magnet temperature of the motor from the detected induced voltage of the motor; and a motor control step of continuing the drive of the motor when the estimated magnet temperature of the motor is higher than a predetermined reference temperature at which the motor needs to be cooled, and stopping the drive of the motor when the magnet temperature of the motor is equal to or lower than the predetermined reference temperature.

Advantageous Effects of Invention

In the cooling control apparatus and the cooling control method for an electric vehicle motor according to the one embodiment of the present invention, the vehicle control part includes: the vehicle stop determination part for determining whether or not the vehicle is stopped; the clutch control part for disengaging the clutch when the stop of the vehicle is determined; the motor control part for driving the motor so as to drive the oil circulation part after the clutch is disengaged; and the motor magnet temperature estimation part for detecting the induced voltage generated by the drive of the motor, and estimating the magnet temperature of the motor from the detected induced voltage of the motor. The motor control part continues the drive of the motor when the estimated magnet temperature of the motor is higher than the predetermined reference temperature at which the motor needs to be cooled, and stops the drive of the motor when the magnet temperature of the motor is equal to or lower than the predetermined reference temperature.

As a result, the damage on the motor can be reduced without causing the sense of discomfort felt by the user.

BRIEF DESCRIPTION OF DRAWINGS

FIG. 8 is a graph showing a relationship between an induced voltage of the motor and the magnet temperature of the motor.

FIG. 9 is a map showing an example of the relationship between the induced voltage of the motor and the magnet temperature of the motor.

DESCRIPTION OF EMBODIMENTS

Figure 1:
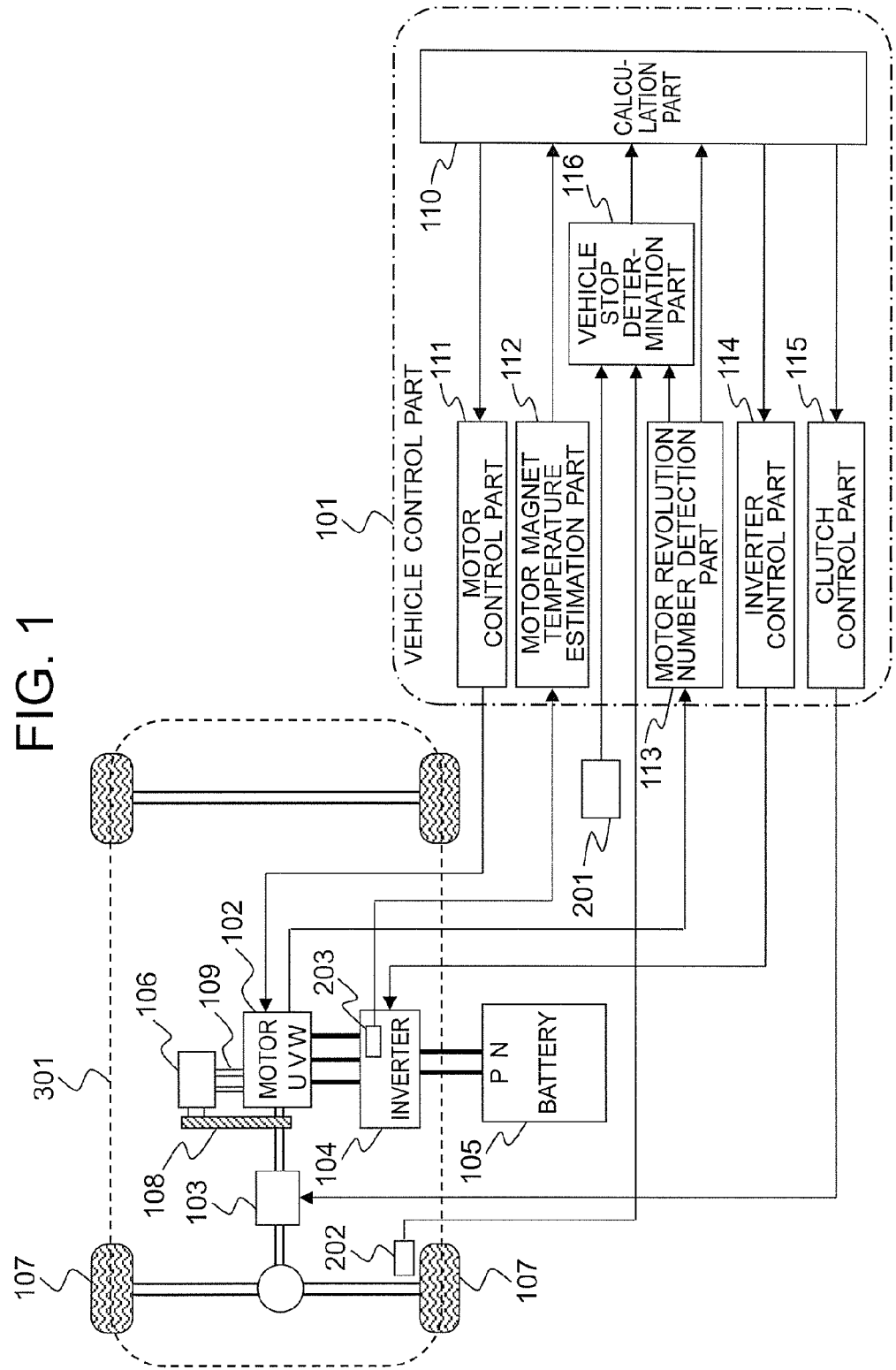
FIG. 1 is a configuration diagram illustrating a cooling control apparatus for an electric vehicle motor according to a first embodiment of the present invention.

A description is now given of a cooling control apparatus and a cooling control method for an electric vehicle motor according to exemplary embodiments of the present invention referring to the drawings, and like or corresponding components are denoted by like reference numerals throughout the drawings.

First Embodiment

FIG. 1 is a configuration diagram illustrating the cooling control apparatus for an electric vehicle motor according to a first embodiment of the present invention. In FIG. 1, a vehicle 301 relating to the cooling apparatus for an electric vehicle motor includes a vehicle control part (control unit) 101, a motor 102, a clutch 103, an inverter 104, a battery 105, an oil circulation part 106, driving wheels 107, a belt 108, and an oil circulation pipe 109.

Moreover, the vehicle control part 101 includes a calculation part (microcomputer) 110, a motor control part 111, a motor magnet temperature estimation part 112, a motor revolution number detection part 113, an inverter control part 114, a clutch control part 115, and a vehicle stop determination part 116. Further, on the vehicle 301, a shift position switch 201, a vehicle speed sensor 202, and a voltage sensor 203 are mounted.

The vehicle control part 101 controls the motor 102, the clutch 103, the inverter 104, and the battery 105 in a unified manner. Details of the control are described later. The motor 102 drives the vehicle 301. The clutch 103 transmits or disconnects an output from the motor 102 to the driving wheels 107.

The inverter 104 converts an output voltage of the battery 105 from a DC voltage to an AC voltage, and supplies the AC voltage to the motor 102. The battery 105 is a power supply for driving the motor 102, or accumulates a regenerative energy. For example, a lithium-ion battery or the like is used therefor.

The oil circulation part 106 is operationally associated with the motor 102 by means of a driving force of the motor 102 via the belt 108, and circulates the oil to an inside of the motor 102 via the oil circulation pipe 109 so as to cool the motor 102. An oil pump, for example, is used. The driving wheels 107 transmit the driving force from the motor 102 to a road surface so as to cause the vehicle 301 to travel.

The belt 108 operationally associates the oil circulation part 106 with the motor 102 by means of the driving force. The oil circulation pipe 109 is an oil passage for circulating the oil for cooling between the motor 102 and the oil circulation part 106.

Moreover, the calculation part 110 in the vehicle control part 101 carries out calculation processing for various types of input information, and outputs calculation processing results.

The motor control part 111 controls the inverter 104 so that the motor 102 generates a torque instructed by the vehicle control part 101. Specifically, the motor control part 111 controls on/off states of a switching signal for the inverter 104 based on signals from a current sensor built into the inverter 104, an angle position sensor (such as a resolver) built into the motor 102, and the like. It should be noted that the CAN communication or the like is used for communication of information between the vehicle control part 101 and the motor control part 111.

The motor magnet temperature estimation part 112 is operated as follows. First, immediately after a stop of the vehicle 301 is determined, the connection between the motor 102 and the driving wheels 107 is disengaged via the clutch 103, and the motor control part 111 forcibly drives the motor 102 constantly at a plurality of numbers of revolutions. Under this state, the motor magnet temperature estimation part 112 uses the voltage sensor 203 mounted to an inside of the inverter 104 to detect an induced voltage of the motor 102.

Then, the motor magnet temperature estimation part 112 compares the detected induced voltage of the motor 102 with an induced voltage in a map representing a relationship between an induced voltage of the motor 102 and the magnet temperature of the motor 102, which is experimentally acquired in advance on an actual machine, to thereby estimate the current magnet temperature of the motor 102.

On this occasion, the calculation processing can be simplified by estimating the magnet temperature of the motor 102 by means of the above-mentioned method, resulting in a reduction in a load on the calculation processing by the calculation part 110. It should be noted that a description is later given of a method of generating the map representing the relationship between the induced voltage of the motor 102 and the magnet temperature of the motor 102.

The magnet temperature of a general motor is estimated by a temperature sensor as described in Patent Literature 1 (JP 2011-83048 A), but it is physically difficult to directly detect the magnet temperature of the motor by means of a temperature sensor because the magnets are a rotating body. Therefore, in general, the magnet temperature of the motor is estimated by detecting the temperature of a stator, which exists in a neighborhood of the magnets, and is not a rotating body.

However, there is a difference in a temperature characteristic between the magnet temperature of the motor and the stator temperature, and the magnet temperature of the motor tends to be higher than the stator temperature. Therefore, calculation processing such as correction is necessary to precisely estimate the magnet temperature of the motor. Moreover, a measurement error of the temperature sensor itself needs to be considered, and it is difficult to estimate a precise magnet temperature of the motor.

Thus, in the first embodiment of the present invention, as a reason for estimating the magnet temperature of the motor 102 from the induced voltage of the motor 102, there may be given such a fact that the magnet temperature of the motor 102 can be physically approximated from the induced voltage of the motor 102 with use of a temperature coefficient or the like of the magnet used in the motor. Therefore, the calculation processing such as the correction and the measurement error of the temperature sensor itself do not need to be considered, and a precise magnet temperature of the motor 102 can be estimated.

The motor revolution number detection part 113 converts a signal of an angle position sensor (such as a resolver) built into the motor 102 into the number of revolutions of the motor 102. The inverter control part 114 uses the inverter 104 to carry out speed control for the motor 102 via an AC power supply variable in the voltage and the frequency. The clutch control part 115 controls the operation of the clutch 103, so as to transmit or disconnect the output from the motor 102 to the driving wheels 107.

The vehicle stop determination part 116 determines whether or not the vehicle 301 is stopped based on outputs from the shift position switch 201, the vehicle speed sensor 202, and the motor revolution number detection part 113. Specifically, when the vehicle stop determination part 116 detects such a state that a shift position of the shift position switch 201 is at a P range or an N range, the vehicle speed of the vehicle 301 from the vehicle speed sensor 202 corresponds to 0 km/h, and the number of revolutions of the motor 102 from the motor revolution number detection part 113 corresponds to 0 rpm, the vehicle stop determination part 116 determines that the vehicle 301 is stopped.

The shift position switch 201 is mounted to a shift lever part (not shown), and outputs the shift position. The vehicle speed sensor 202 generates a pulse signal corresponding to the speed of the vehicle 301 based on a wheel speed sensor mounted to the driving wheel 107. The voltage sensor 203 is mounted to the inside of the inverter 104 so as to measure a phase voltage, and detects the induced voltage of the motor 102.

Figure 2:
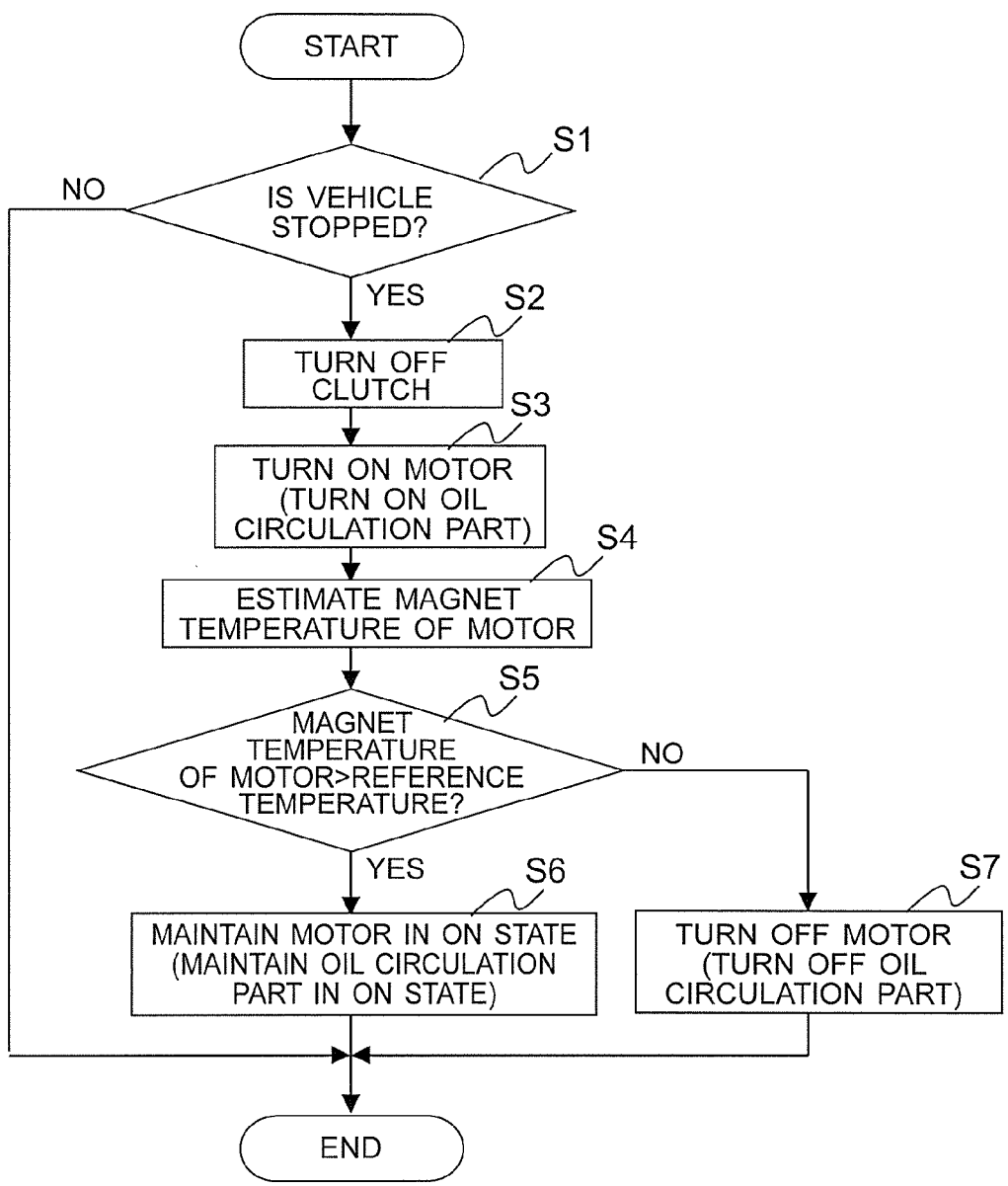
FIG. 2 is a flowchart illustrating control processing by the cooling control apparatus for an electric vehicle motor according to the first embodiment of the present invention.

Referring to a flowchart of FIG. 2, a description is now given of control processing by the cooling control apparatus for an electric vehicle motor according to the first embodiment of the present invention. It should be noted that the flowchart of FIG. 2 is carried out at a predetermined cycle by the vehicle control part 101.

First, whether or not the vehicle 301 is stopped is determined (Step S1). On this occasion, the vehicle stop determination part 116 determines whether or not the vehicle 301 is stopped based on the outputs from the shift position switch 201, the vehicle speed sensor 202, and the motor revolution number detection part 113.

In other words, when the vehicle stop determination part 116 detects such a state that the shift position of the shift position switch 201 is at the P range or the N range, the vehicle speed of the vehicle 301 from the vehicle speed sensor 202 corresponds to 0 km/h, and the number of revolutions of the motor 102 from the motor revolution number detection part 113 corresponds to 0 rpm, the vehicle stop determination part 116 determines that the vehicle 301 is stopped.

In Step S1, when it is determined that the vehicle 301 is not stopped (namely, NO), the processing in FIG. 2 is finished immediately.

On the other hand, in Step S1, when it is determined that the vehicle 301 is stopped (namely, YES), the clutch 103 is turned off (disengaged) by the clutch control part 115 (Step S2).

Then, the oil circulation part 106 is turned on (driven) in operational association with the motor 102 forcibly turned on (driven) by the motor control part 111 so as to supply the oil to heat generation parts of the motor 102 requiring the cooling (Step S3). It should be noted that the ON (drive) state of the motor 102 brings the motor 102 into a state of driving at a plurality of numbers of revolutions constantly.

Then, the magnet temperature of the motor 102 is estimated by the motor magnet temperature estimation part 112 from the induced voltage of the motor 102 detected by the voltage sensor 203 (Step S4).

Then, whether or not the estimated magnet temperature of the motor 102 is higher than a predetermined reference temperature is determined (Step S5). On this occasion, this determination is a determination on whether or not the magnet temperature of the motor 102 is a high temperature exceeding the reference temperature at which the motor 102 needs to be cooled.

In Step S5, when it is determined that the magnet temperature of the motor 102 is higher than the predetermined reference temperature (namely, YES), the motor 102 and the oil circulation part 106 remain to be in the ON (drive) state, the number of revolutions of the motor 102 is increased (Step S6), and the processing of FIG. 2 is finished.

On this occasion, the number of revolutions of the oil circulation part 106 increases in operational association with the increase in the number of revolutions of the motor 102, and a circulation speed of the oil increases accordingly, resulting in increase in a heat radiation effect and effective cooling of the heat generation parts of the motor 102.

On the other hand, in Step S5, when it is determined that the magnet temperature of the motor 102 is equal to or lower than the predetermined reference temperature (namely, NO), the motor 102 and the oil circulation part 106 are turned off (stopped) (Step S7), and the processing of FIG. 2 is finished.

Figure 3:
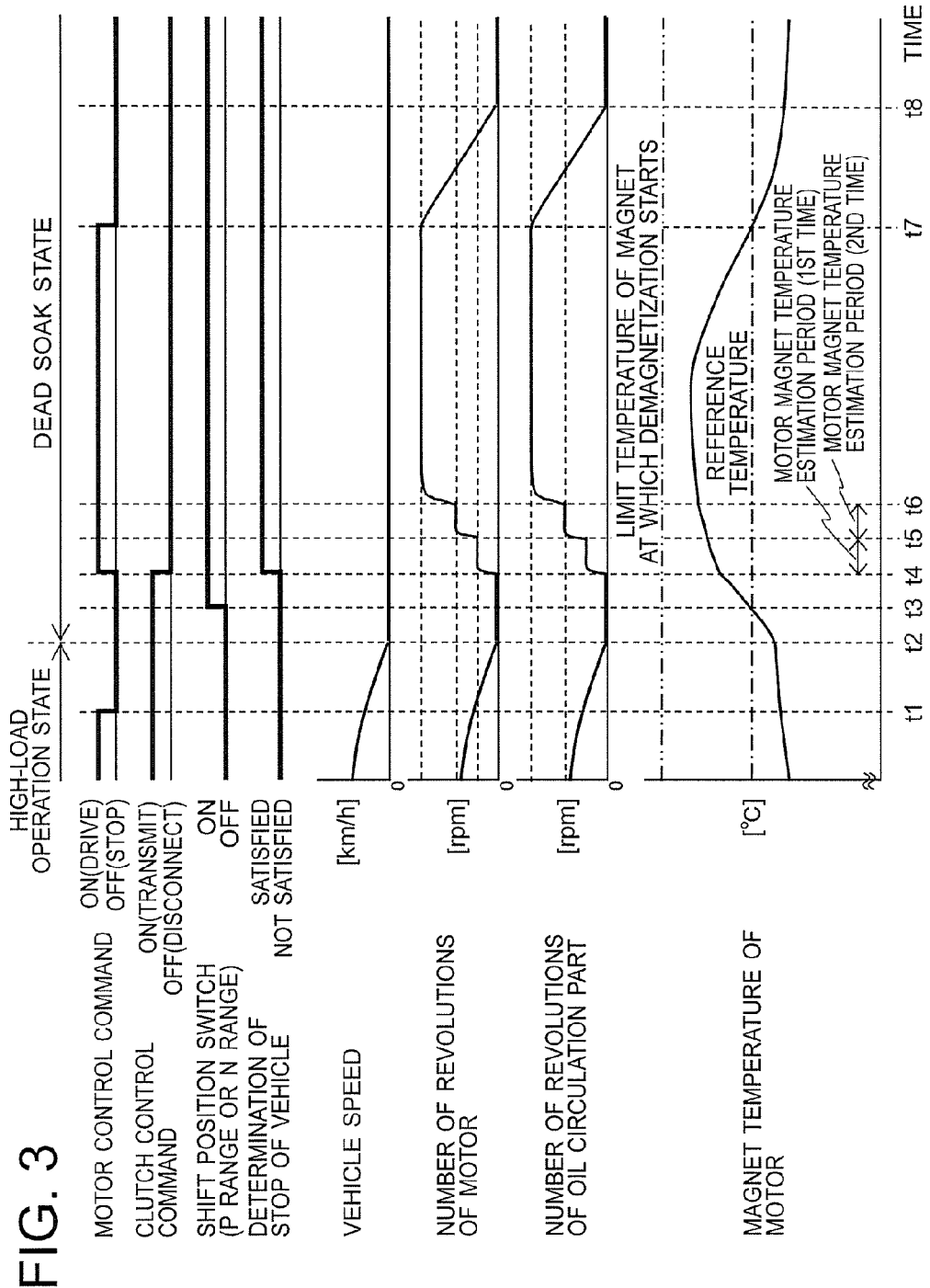
FIG. 3 is a timing chart illustrating a result of the control processing (magnet temperature of a motor>reference temperature) by the cooling control apparatus for an electric vehicle motor according to the first embodiment of the present invention.

Referring to a timing chart of FIG. 3, a description is now given of results of the control processing carried out when the magnet temperature of the motor 102 is determined to be higher than the predetermined reference temperature.

In FIG. 3, a horizontal axis represents time, and a vertical axis represents, in sequence, a motor control command, a clutch control command, the shift position switch, the stop determination for the vehicle, the vehicle speed, the number of revolutions of the motor, the number of revolutions of the oil circulation part, and the magnet temperature of the motor 102.

Moreover, in FIG. 3, t1 is a timing at which the vehicle control part 101 issues a command so that the motor 102 is switched from the ON (drive) state to the OFF (stop) state. Moreover, t2 is a timing at which the motor 102 and the oil circulation part 106 operationally associated with the motor 102 are actually turned off (stopped).

A timing t3 is a timing at which the shift position is shifted to the P range or the N range. Moreover, t4 is a timing at which, simultaneously with the stop determination of the vehicle 301, the vehicle control part 101 issues such a command that the clutch 103 is switched from the ON (transmission) state to the OFF (disengagement) state, and then the motor 102 is switched from the OFF (stop) state to the ON (drive) state.

On this occasion, the operationally associated oil circulation part 106 is also turned on (driven) by forcibly turning on (driving) the motor 102. It should be noted that the ON (drive) state of the motor 102 brings the motor 102 into the state of driving at the plurality of numbers of revolutions constantly.

In a period from t4 to t5, the first magnet temperature of the motor 102 is estimated from the induced voltage of the motor 102 detected by the voltage sensor 203. Moreover, in a period from t5 to t6, the magnet second temperature of the motor 102 is estimated from the induced voltage of the motor 102 detected by the voltage sensor 203.

A timing t6 is a timing at which whether the motor 102 and the oil circulation part 106 are turned off (stopped) or are allowed to remain in the ON (drive) state is determined by comparing the magnet temperatures of the motor 102 estimated in the period from t4 to t5 and the period from t5 to t6 with the predetermined reference temperature at which the motor 102 needs to be cooled.

In the case of FIG. 3, it is determined that the estimated magnet temperature of the motor 102 is higher than the reference temperature at which the motor 102 needs to be cooled, the ON (drive) state of the motor 102 is continued, and the number of revolutions of the motor 102 is increased. On this occasion, the number of revolutions of the oil circulation part 106 operationally associated with the motor 102 is increased by increasing the number of revolutions of the motor 102. Therefore, the circulation speed of the oil increases, and a heat radiation effect thus increases.

It should be noted that the ON (drive) period (period from t6 to t7) of the motor 102 is made into a map for each magnet temperature of the motor 102. Specifically, the map is generated by, for the each magnet temperature of the motor 102, experimentally acquiring in advance an ON (drive) period of the motor 102, which decreases the magnet temperature of the motor 102 to be equal to or lower than the predetermined reference temperature, at a predetermined number of revolutions of the motor 102 on the actual machine.

A timing t7 is a timing at which the vehicle control part 101 issues a command to bring the motor 102 from the ON (drive) state to the OFF (stop) state simultaneously with a timing at which the magnet temperature of the motor 102 becomes lower than the reference temperature at which the motor 102 needs to be cooled. Moreover, t8 is a timing at which the motor 102 and the oil circulation part 106 operationally associated with the motor 102 are actually turned off (stopped).

Figure 4:
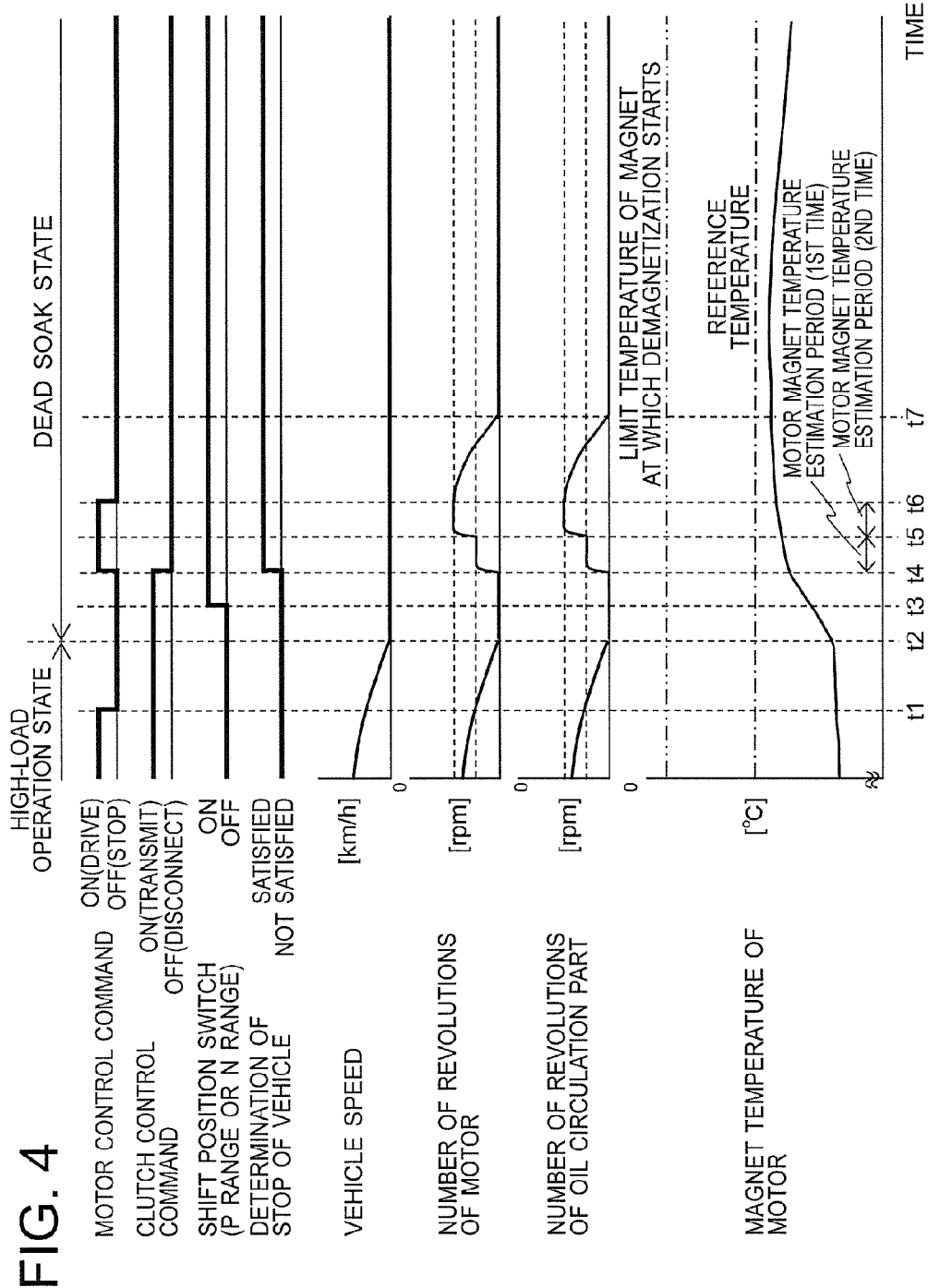
FIG. 4 is a timing chart illustrating a result of the control processing (magnet temperature of a motor≤reference temperature) by the cooling control apparatus for an electric vehicle motor according to the first embodiment of the present invention.

Referring to a timing chart of FIG. 4, a description is now given of results of the control processing carried out when the magnet temperature of the motor 102 is determined to be equal to or lower than the predetermined reference temperature.

In FIG. 4, a horizontal axis represents time, and a vertical axis represents, in sequence, the motor control command, the clutch control command, the shift position switch, the stop determination for the vehicle, the vehicle speed, the number of revolutions of the motor, the number of revolutions of the oil circulation part, and the magnet temperature of the motor 102.

Moreover, in FIG. 4, t1 is a timing at which the vehicle control part 101 issues a command so that the motor 102 is switched from the ON (drive) state to the OFF (stop) state. Moreover, t2 is a timing at which the motor 102 and the oil circulation part 106 operationally associated with the motor 102 are actually turned off (stopped).

A timing t3 is a timing at which the shift position is shifted to the P range or the N range. Moreover, t4 is a timing at which, simultaneously with the stop determination of the vehicle 301, the vehicle control part 101 issues such a command that the clutch 103 is switched from the ON (transmission) state to the OFF (disengagement) state, and then the motor 102 is switched from the OFF (stop) state to the ON (drive) state.

On this occasion, the operationally associated oil circulation part 106 is also turned on (driven) by forcibly turning on (driving) the motor 102. It should be noted that the ON (drive) state of the motor 102 brings the motor 102 into the state of driving at the plurality of numbers of revolutions constantly.

In a period from t4 to t5, the first magnet temperature of the motor 102 is estimated from the induced voltage of the motor 102 detected by the voltage sensor 203. Moreover, in a period from t5 to t6, the second magnet temperature of the motor 102 is estimated from the induced voltage of the motor 102 detected by the voltage sensor 203.

A timing t6 is a timing at which whether the motor 102 and the oil circulation part 106 are turned off (stopped) or are allowed to remain in the ON (drive) state is determined by comparing the magnet temperatures of the motor 102 estimated in the period from t4 to t5 and the period from t5 to t6 with the reference temperature defined at which the motor 102 needs to be cooled.

In the case of FIG. 4, the estimated magnet temperature of the motor 102 is determined to be equal to or lower than the reference temperature at which the motor 102 needs to be cooled, and the vehicle control part 101 thus issues a command to bring the motor 102 from the ON (drive) state to the OFF (stop) state.

A timing t7 is a timing at which the motor 102 and the oil circulation part 106 operationally associated with the motor 102 are actually turned off (stopped).

Figure 5:
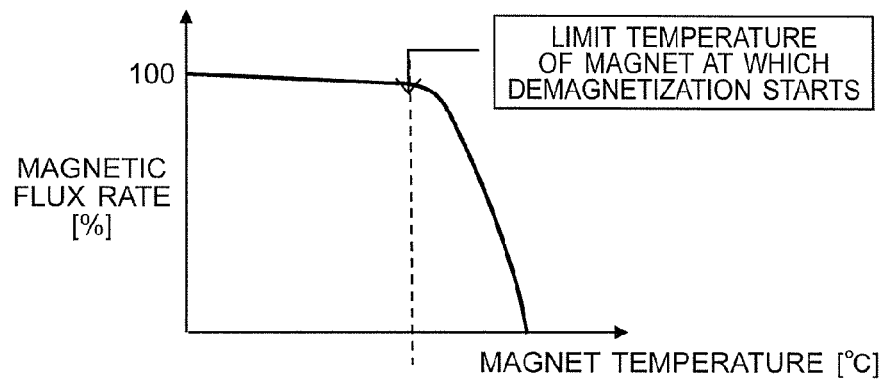
FIG. 5 is a graph showing a relationship between a magnetic flux rate of the magnet and the magnet temperature.
Figure 6:
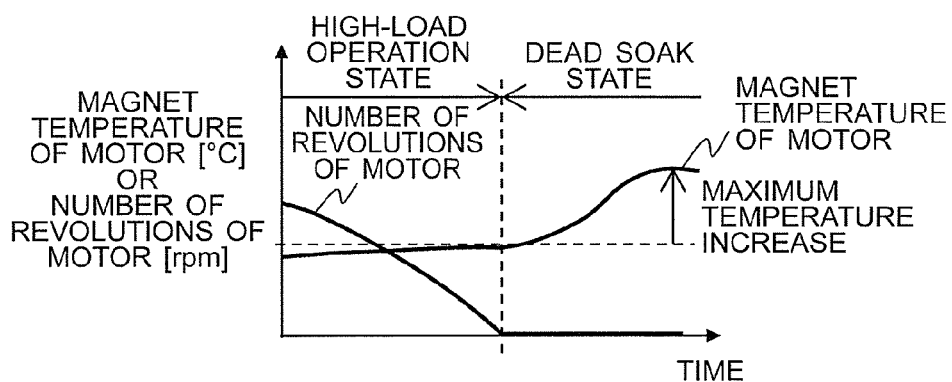
FIG. 6 is a graph showing a transition of the magnet temperature of the motor from a high load state to a dead soak state.

Referring to FIGS. 5 and 6, a description is now given of a method of setting the reference temperature (reference temperature in Step S5 of FIG. 2) for the magnet temperature of the motor 102. FIG. 5 is a graph showing a relationship between a magnetic flux rate of the magnet and the magnet temperature, and FIG. 6 is a graph showing a transition of the magnet temperature of the motor 102 from a high load state to a dead soak state.

The reference temperature for the magnet temperature of the motor 102 is set by confirming a limit temperature (FIG. 5) of the magnet at which the demagnetization starts and the maximum rise (FIG. 6) of the magnet temperature in the dead soak state experimentally on the actual machine in advance, then subtracting the maximum rise of the magnet temperature in the dead soak state from the limit temperature of the magnet at which the demagnetization starts, and multiplying a result of the subtraction by a safety factor.

The reference temperature for the magnet temperature of the motor 102 can be set in this way so that a damage does not occur on the motor 102 such as the magnet demagnetization phenomenon, which is generated when the magnet temperature exceeds the limit temperature of the magnet, even when the magnet temperature of the motor 102 is in the dead soak state.

Moreover, such a control that the ON/OFF states of the motor 102 are prevented from being repeated in a short period when the magnet temperature of the motor 102 fluctuates can be realized by providing hysteresis for the reference temperature of the magnet temperature of the motor 102, which prevents the user from feeling a sense of discomfort.

Figure 7:
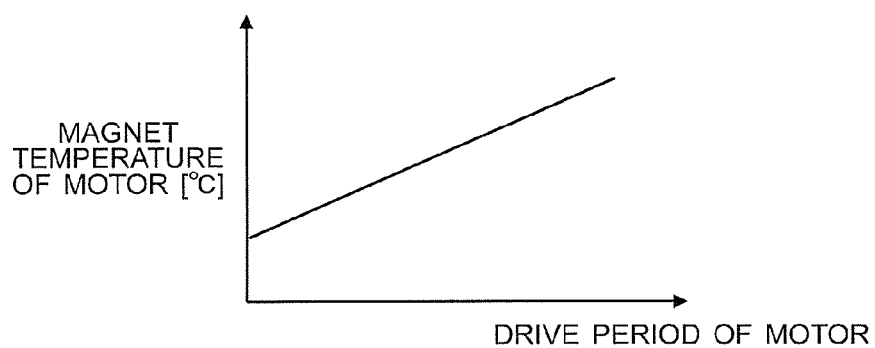
FIG. 7 is a graph showing a relationship between the magnet temperature of the motor and a drive period of the motor.

Referring to FIG. 7, a description is now given of a method of generating the map of the ON (drive) period of the motor 102 (period from t6 to t7 of FIG. 3). FIG. 7 is a graph showing a relationship between the magnet temperature of the motor 102 and the drive period of the motor.

The map of the ON (drive) period (period from t6 to t7 of FIG. 3) of the motor 102 is generated by, for each magnet temperature of the motor 102, experimentally acquiring in advance an ON (drive) period of the motor 102, which decreases the magnet temperature of the motor 102 to be equal to or lower than the predetermined reference temperature at a predetermined number of revolutions of the motor 102 on the actual machine, and setting the acquired ON (drive) period of the motor 102 into a map for the each magnet temperature of the motor 102.

Referring to FIGS. 8 and 9, a description is now given of a method of generating a map for estimating the magnet temperature of the motor 102 from the induced voltage of the motor 102, which is experimentally acquired in advance on the actual machine. FIG. 8 is a graph showing a relationship between the induced voltage of the motor 102 and the magnet temperature of the motor 102, and FIG. 9 is a map showing an example of the relationship between the induced voltage of the motor 102 and the magnet temperature of the motor 102.

First, the vehicle is set on a chassis dynamometer, and is brought into the soak state at a normal temperature (such as approximately 20° C.)

Then, after the completion of the soak, the vehicle is caused to travel, and the induced voltage of the motor is quickly measured in this state. The measured value is assumed as the induced voltage of the motor in the normal temperature state. Travel conditions are, for example, the rotational speed of the motor=3,000 rpm, a target torque of the motor=0 Nm, and chassis dynamometer control=speed control. On this occasion, it is assumed that the induced voltage in the normal temperature state is, for example, 100 V.

Then, the vehicle is caused to travel under a constant load condition in order to increase the magnet temperature of the motor from the normal temperature state, and the induced voltage of the motor is measured on this occasion. Travel conditions are, for example, the rotational speed of the motor=3,000 rpm, the target torque of the motor=30 Nm, and the chassis dynamometer control=speed control. On this occasion, it is assumed that the induced voltage during the constant load travel is, for example, 99 V.

Then, a magnet temperature of the motor under the constant load condition is acquired based on a change rate of the induced voltage of the motor from the normal temperature state of the magnet temperature of the motor to the state of the travel under the constant load condition and a temperature coefficient of the magnet used for the motor by using the measured induced voltage in the normal temperature state and the measured induced voltage during the constant load travel.

On this occasion, the change rate of the induced voltage from the normal temperature state to the state during the constant load travel is −1.0%, which is a result of the change from 100 V to 99 V. Moreover, regarding the temperature coefficient of the magnet, for example, the temperature coefficient of the neodymium magnet generally used is approximately −0.10/° C. From these facts, an increase in the magnet temperature of the motor from the normal temperature state is Δ10° C., and the actual temperature is estimated to be the normal temperature state (20° C.)+the increase (10° C.)=30° C.

Then, the acquired relationship between the induced voltage of the motor and the magnet temperature of the motor is set into a graph, and an approximation equation is acquired based on an approximation line by means of interpolation between two points (FIG. 8).

Finally, the induced voltage for each magnet temperature of the motor is acquired from the approximation equation acquired from the graph of FIG. 8, and a map shown in FIG. 9 is then generated.

As described above, according to the first embodiment, the vehicle control part includes the vehicle stop determination part for determining whether or not the vehicle is stopped, the clutch control part for disengaging the clutch when the stop of the vehicle is determined, the motor control part for driving the motor so as to drive the oil circulation part after the clutch is disengaged, and the motor magnet temperature estimation part for detecting the induced voltage generated by the drive of the motor, and estimating the magnet temperature of the motor from the detected induced voltage of the motor. The motor control part continues the drive of the motor when the estimated magnet temperature of the motor is higher than the predetermined reference temperature at which the motor needs to be cooled, and stops the drive of the motor when the magnet temperature of the motor is equal to or lower than the predetermined reference temperature.

Therefore, in the control routine, regardless of the magnet temperature of the motor, the clutch is disengaged immediately after the stop of the vehicle is determined, and the motor is forcibly driven. Thus, the behavior of the vehicle immediately after the stop of the vehicle is determined is constant, and hence the user does not feel the sense of discomfort.

Moreover, even if some problem is present in the motor magnet temperature estimation part, the motor is forcibly driven immediately after the stop of the vehicle is determined, and the oil circulation part is driven in operational association with the drive of the motor. Therefore, even when the magnet temperature of the motor is higher than the predetermined reference temperature at which the motor needs to be cooled in the dead soak state immediately after a high load operation such as a low-speed hill-climbing travel, the increase in the magnet temperature of the motor can be suppressed, and a damage on the motor such as the magnet demagnetization phenomenon and the like can be reduced.

In other words, the damage on the motor can be reduced without causing the sense of discomfort felt by the user.

Moreover, the motor control part constantly drives the motor at a plurality of numbers of revolutions when the motor is driven after the clutch is disengaged.

Therefore, a plurality of induced voltages of the motor can be detected, and the magnet temperature of the motor can be highly precisely estimated.

Moreover, the motor control part increases the number of revolutions of the motor when the magnet temperature of the motor is higher than the reference temperature.

Therefore, the number of revolutions of the oil circulation part operationally associated with the motor increases as a result of the increase in the number of revolutions of the motor, and the circulation speed of the motor can be increased. As a result, the heat radiation effect can be further increased, and the heat generation parts (magnets, coils, cores, and the like) of the motor can thus be cooled, resulting in suppression of an increase in the magnet temperature of the motor and a reduction in the damage on the motor such as the magnet demagnetization phenomenon.

Moreover, the motor control part drives the motor for the period set in advance so that the magnet temperature of the motor is equal to or lower than the reference temperature for each magnet temperature of the motor.

Therefore, the secured cooling of the motor and the suppression of a useless consumption of the battery caused by the drive of the motor can simultaneously be realized, and the motor can be driven for the optimal period for the each magnet temperature of the motor.

The invention claimed is:

1. A cooling control apparatus for an electric vehicle motor, comprising:
 a motor for transmitting power to a wheel of a vehicle;
 a clutch for transmitting or disconnecting the power from the motor to the wheel;
 an oil circulator to be driven in operational association with the motor, for circulating oil to the motor; and
 a controller for controlling operations of the motor and the clutch, wherein:
 the controller configured to:
  determine whether or not the vehicle is stopped;
  disengage the clutch when stop of the vehicle is determined;
  drive the motor so as to drive the oil circulation part after the clutch is disengaged; and
  detect an inducted voltage generated by drive of the motor, and estimating a magnet temperature of the motor from the detected induced voltage of the motor; and
 continue the drive of the motor when the estimated magnet temperature of the motor is higher than a predetermined reference temperature at which the motor needs to be cooled, and stops the drive of the motor when the magnet temperature of the motor is equal to or lower than the predetermined reference temperature,
 wherein the motor control part constantly drives the motor at a plurality of numbers of revolutions when the motor is driven after the clutch is disengaged.

2. A cooling control apparatus for an electric vehicle motor, comprising:
 a motor for transmitting power to a wheel of a vehicle;
 a clutch for transmitting or disconnecting the power from the motor to the wheel;
 an oil circulator to be driven in operational association with the motor, for circulating oil to the motor; and
 a controller for controlling operations of the motor and the clutch, wherein:
 the controller configured to:
  determine whether or not the vehicle is stopped;
  disengage the clutch when stop of the vehicle is determined;
  drive the motor so as to drive the oil circulation part after the clutch is disengaged; and
  detect an inducted voltage generated by drive of the motor, and estimating a magnet temperature of the motor from the detected induced voltage of the motor; and
 continue the drive of the motor when the estimated magnet temperature of the motor is higher than a predetermined reference temperature at which the motor needs to be cooled, and stops the drive of the motor when the magnet temperature of the motor is equal to or lower than the predetermined reference temperature,
 wherein the motor control part increases a number of revolutions of the motor when the magnet temperature of the motor is higher than the predetermined reference temperature.

3. The cooling control apparatus for an electric vehicle motor according to claim 1, wherein the motor control part increases a number of revolutions of the motor when the magnet temperature of the motor is higher than the predetermined reference temperature.

4. A cooling control apparatus for an electric vehicle motor, comprising:
 a motor for transmitting power to a wheel of a vehicle;
 a clutch for transmitting or disconnecting the power from the motor to the wheel;
 an oil circulator to be driven in operational association with the motor, for circulating oil to the motor; and
 a controller for controlling operations of the motor and the clutch, wherein:
 the controller configured to:
  determine whether or not the vehicle is stopped;
  disengage the clutch when stop of the vehicle is determined;
  drive the motor so as to drive the oil circulation part after the clutch is disengaged; and
  detect an inducted voltage generated by drive of the motor, and estimating a magnet temperature of the motor from the detected induced voltage of the motor; and
 continue the drive of the motor when the estimated magnet temperature of the motor is higher than a predetermined reference temperature at which the motor needs to be cooled, and stops the drive of the motor when the magnet temperature of the motor is equal to or lower than the predetermined reference temperature, wherein the motor control part drives the motor for a period set in advance so that the magnet temperature of the motor is equal to or lower than the predetermined reference temperature for each magnet temperature of the motor.

5. The cooling control apparatus for an electric vehicle motor according to claim 1, wherein the controller drives the motor for a period set in advance so that the magnet temperature of the motor is equal to or lower than the predetermined reference temperature for each magnet temperature of the motor.

6. The cooling control apparatus for an electric vehicle motor according to claim 2, wherein the controller drives the motor for a period set in advance so that the magnet temperature of the motor is equal to or lower than the predetermined reference temperature for each magnet temperature of the motor.

7. The cooling control apparatus for an electric vehicle motor according to claim 3, wherein the controller drives the motor for a period set in advance so that the magnet temperature of the motor is equal to or lower than the predetermined reference temperature for each magnet temperature of the motor.

8. A cooling control method for an electric vehicle motor, which is to be executed in an electric vehicle comprising:
   a motor for transmitting power to a wheel of the electric vehicle;
   a clutch for transmitting or disconnecting the power from the motor to the wheel; and
   an oil circulator to be driven in operational association with the motor, for circulating oil to the motor;
the cooling control method comprising:
   a vehicle stop determining step of determining whether or not the vehicle is stopped;
   a clutch disengaging step of disengaging the clutch when stop of the vehicle is determined;
   a motor driving step of driving the motor so as to drive the oil circulation part after the clutch is disengaged;
   a motor magnet temperature estimating step of detecting an inducted voltage generated by drive of the motor, and estimating a magnet temperature of the motor from the detected induced voltage of the motor; and
   a motor control step of continuing the drive of the motor when the estimated magnet temperature of the motor is higher than a predetermined reference temperature at which the motor needs to be cooled, and stopping the drive of the motor when the magnet temperature of the motor is equal to or lower than the predetermined reference temperature,
wherein the motor control step increases a number of revolutions of the motor when the magnet temperature of the motor is higher than the predetermined reference temperature.

* * * * *